(12) United States Patent
Zeisler

(10) Patent No.: US 8,632,252 B2
(45) Date of Patent: Jan. 21, 2014

(54) GREASE BAFFLE SYSTEM

(75) Inventor: Joseph Zeisler, Grafton, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 69 days.

(21) Appl. No.: 13/359,076

(22) Filed: Jan. 26, 2012

(65) Prior Publication Data

US 2013/0001358 A1  Jan. 3, 2013

Related U.S. Application Data

(60) Provisional application No. 61/502,895, filed on Jun. 30, 2011.

(51) Int. Cl.
*F16C 33/78* (2006.01)

(52) U.S. Cl.
USPC ............... 384/477; 384/488; 384/489

(58) Field of Classification Search
USPC .................. 384/477–483, 488, 489
See application file for complete search history.

(56) References Cited

U.S. PATENT DOCUMENTS

| | | | | |
|---|---|---|---|---|
| 2,028,207 | A | * | 1/1936 | Hamilton ............. 301/6.2 |
| 2,888,303 | A | * | 5/1959 | Mempel ............. 384/480 |
| 3,768,881 | A | * | 10/1973 | Bender et al. ............. 384/484 |
| 3,794,392 | A | | 2/1974 | Scott |
| 3,833,273 | A | | 9/1974 | Rickley |
| 3,890,021 | A | * | 6/1975 | Smith et al. ............. 384/409 |
| 4,770,424 | A | | 9/1988 | Otto |
| 4,799,808 | A | | 1/1989 | Otto |
| 4,832,511 | A | | 5/1989 | Nisley |
| 5,044,809 | A | | 9/1991 | Galanty |
| 5,080,156 | A | | 1/1992 | Bartos |
| 5,655,845 | A | | 8/1997 | Lampart |
| 6,371,487 | B1 | | 4/2002 | Cimbura, Sr. |
| 6,834,859 | B2 | | 12/2004 | Tones |
| 2004/0175065 | A1 | | 9/2004 | Nguyen |
| 2006/0147141 | A1 | | 7/2006 | Harwood et al. |
| 2008/0044120 | A1 | | 2/2008 | Komori |

FOREIGN PATENT DOCUMENTS

| | | |
|---|---|---|
| CN | 201083238 | 7/2008 |
| CN | 201382092 | 1/2010 |
| FR | 2831232 | 4/2003 |
| GB | 770716 | 3/1957 |
| GB | 840166 | 7/1960 |
| GB | 1308098 | 2/1973 |

OTHER PUBLICATIONS

Anonymous; Chemical Engineering Process, V. 101, n 5, p. 19; Seals for Deep-Groove Ball Bearings Promote Longer Service Life; Retrieved from DialogWeb; May 2005.
Gerhart et al.;"Labyrinth seals for INA ball bearings"; Oct. 1995.

* cited by examiner

*Primary Examiner* — Thomas R Hannon
(74) *Attorney, Agent, or Firm* — Renner, Otto, Boisselle & Sklar, LLP.

(57) ABSTRACT

A grease baffle that may be installed and removed independently of an outer race of a bearing assembly, thus reducing or eliminating damage to the grease baffle during maintenance actions, eliminating the potential for damage to the bearing support body for maintenance actions requiring removal of the grease baffle but not removal of the outer race, and reducing maintenance time and maintenance costs. The grease baffle may be retained in the support body by a retaining ring or a resilient sealing member, and may be preloaded against a retaining surface.

11 Claims, 4 Drawing Sheets

GREASE BAFFLE SYSTEM

RELATED APPLICATIONS

This application claims the benefit of U.S. Provisional Application No. 61/502,895 filed Jun. 30, 2011, which is hereby incorporated herein by reference.

FIELD OF INVENTION

The present invention relates to bearing assemblies, and more particularly to a grease baffle seal for use in a bearing assembly wherein a grease baffle is sealed at its outer diameter by a resilient sealing member providing a preload against a retaining surface.

BACKGROUND

Bearing assemblies generally include balls or cylinders (generically, "bearing elements") which are positioned between an inner bearing race and an outer bearing race. Bearing assemblies may be either inner or outer rotators depending on whether the rim or shaft rotates. For mechanisms using a rotating shaft, the inner bearing race rotates with the shaft. For mechanisms using a rotating rim, the outer bearing race rotates with the rim. The bearing elements are preferably evenly spaced within the inner bearing race and outer bearing race. The bearing elements may be held in this evenly spaced position by, for example, teeth of a roller cage.

Bearing lubricant fluid is used in bearing assemblies to encourage free movement of the bearing elements, inner bearing race, and outer bearing race. During operation, however, the lubricant tends to migrate and eventually may escape the bearing assembly. The lubricant that migrates and escapes the bearing assembly can then enter the rest of the mechanism utilizing the bearing assembly, and even exit the mechanism completely.

Known grease baffles may be installed between the outer bearing race and the outer support body (or "register") holding the outer race and any maintenance or assembly action that requires removal of the outer bearing race or grease baffle requires removing both the race and grease baffle. This operation results in a damaged or destroyed grease baffle and damage to the support body.

SUMMARY OF INVENTION

The present invention provides for a grease baffle that may be installed and removed independently of the outer race thus reducing or eliminating damage to the grease baffle during maintenance actions. Further, the present invention eliminates the potential for damage to the bearing support body for maintenance actions requiring removal of the grease baffle but not removal of the outer race. Moreover, the present invention results in reduced maintenance time and reduced maintenance costs.

One aspect of the present invention provides for a bearing assembly including an outer race, an inner race, a plurality of bearing elements disposed between the inner and outer races for allowing relative rotational movement between the inner and outer race, an annular support body rigidly supporting the outer race and extending therefrom in an axial direction, an annular grease baffle disposed axially proximal to the outer race and inner race for preventing migration of grease away from the plurality of bearing elements, and an annular resilient sealing member interposed between the baffle and an abutment surface, wherein the sealing member axially biases an outer periphery of the baffle against the retaining surface for preventing movement of the baffle with respect to the support body. The annular grease baffle has a portion disposed against a retaining surface The resilient sealing member may be disposed in an annular groove in the support body.

The bearing assembly may include an annular retaining element having the retaining surface, the retaining element being disposed in an annular retaining element groove of the support body.

The retaining surface may be an axial surface of the outer race.

The annular resilient sealing member may be disposed between the grease baffle and an axial ledge of the support body.

The annular grease baffle may be removable from the support body without removal of the outer race.

The bearing assembly may be in combination with an aircraft wheel. The combination may include wheel halves, each half including a bearing assembly, a hub half forming the support body and the hub halves collectively defining an interior space, and a bearing seal for sealing the bearing assembly from an exterior side of the wheel half. The grease baffles may be disposed on an interior side of the wheel half for preventing grease from migrating out of the bearing assembly into the interior space.

The grease baffles may be removable, independent of the outer races, from the hub halves forming the support bodies by removal of respective retaining rings or resilient sealing members.

Another aspect of the present invention provides for a method for preventing lubricant from migrating out of a bearing assembly having an outer race, an inner race, a plurality of bearing elements disposed between the inner and outer races, an annular support body rigidly supporting the outer race and extending therefrom in an axial direction, an annular grease baffle disposed axially proximal to the outer race and inner race and having a portion disposed against a retaining surface, and an annular resilient sealing member interposed between the baffle and an abutment surface. The method may include the steps of preloading a grease baffle against a retaining surface with the annular resilient sealing member, and sealing an interface between the grease baffle and a support body with the annular resilient sealing member.

Another aspect of the present invention provides for a method for removing a grease baffle from a bearing assembly having a an outer race, an inner race, a plurality of bearing elements disposed between the inner and outer races, an annular support body rigidly supporting the outer race and extending therefrom in an axial direction, an annular grease baffle disposed axially proximal to the outer race and inner race and having a portion disposed against a retaining surface, and an annular resilient sealing member interposed between the baffle and an abutment surface. The method may include the steps of removing an annular resilient sealing member, and removing the grease baffle without removing and without damaging an outer race.

The method may also include the step of removing a retaining element from a retaining element groove in a support body.

The foregoing and other features of the invention are hereinafter described in greater detail with reference to the accompanying drawings.

DETAILED DESCRIPTION

A bearing assembly in accordance with present invention may be used in a number of applications, but, for ease of explanation and comprehension, will be described herein in reference to a tapered roller bearing assembly for use in an aircraft wheel. The invention is equally applicable in other settings and to other bearing assemblies, for example ball bearing assemblies, as long as the bearing type involves radial differential motion with inner and outer interfaces separated by a gap or across the width of the bearing assembly.

Figure 1:
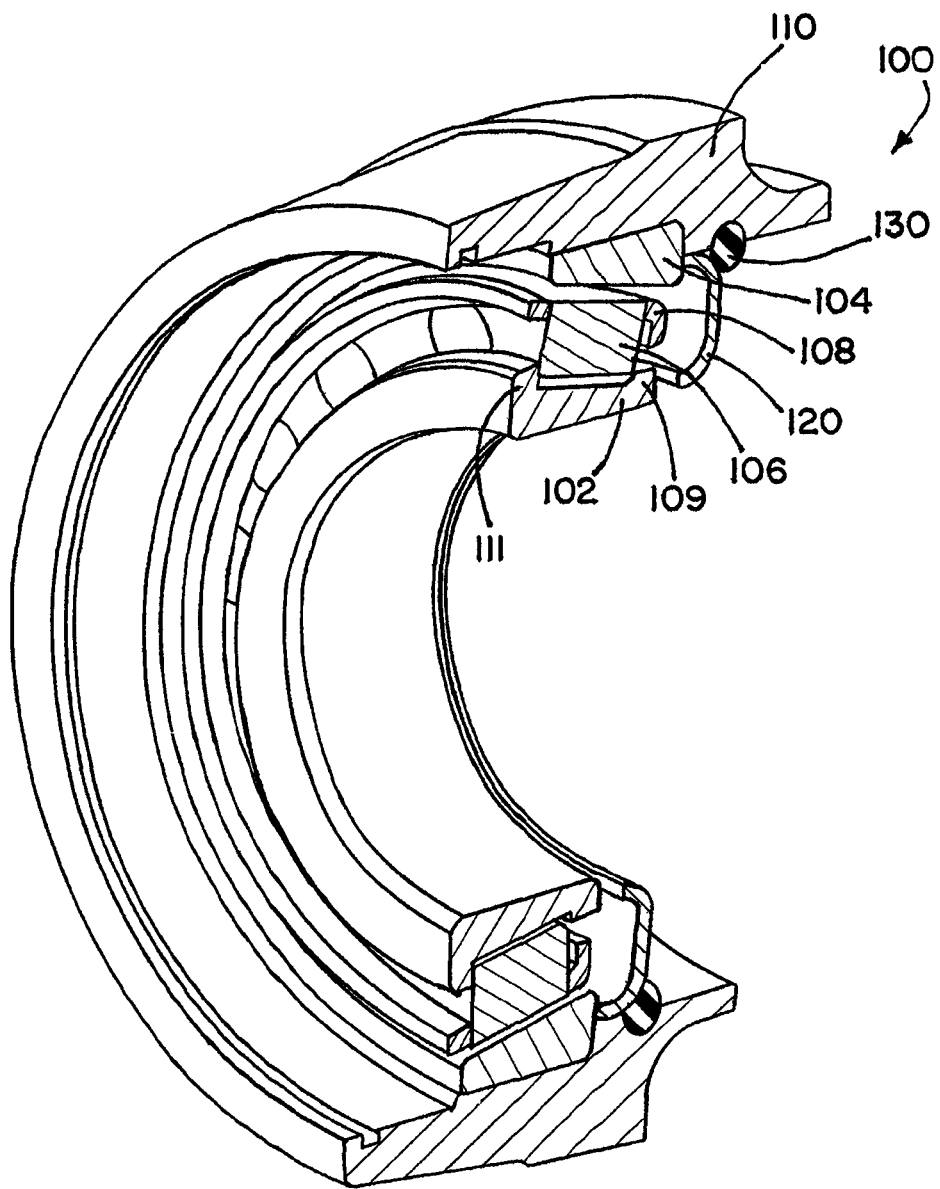
FIG. 1 is a sectioned perspective view of a bearing assembly in accordance with the present invention including a c-shaped grease baffle.

FIG. 1 is a perspective view of a bearing assembly 100 that may be used in accordance with aspects of the present invention. The bearing assembly 100 may include an inner race 102 and an outer race 104. Positioned between the inner race 102 and the outer race 104 are a plurality of bearing elements 106 held in spaced alignment by a roller cage 108.

The bearing elements may be guided by flanges 109, 111 on the inner race 102 that prevents the bearing elements 106 from sliding out of the assembly 100.

The inner race 102 and outer race 104 may be segments of cones and the bearing elements 106 may also be made with a taper so that the conical surfaces of the races 102, 104 and the axes of the bearing elements 106 would, if projected, meet at a common point on the main axis of the bearing assembly 100.

This conical geometry may be used in certain applications so as to provide a relatively large contact surface between the bearing elements 106 and the races 102, 104, which permits greater loads to be carried than with spherical (ball) bearings, while still preventing differential scrubbing between the surfaces.

The half angle of these cones may be selected so as to provide appropriate strength for sustaining axial loads applied to the bearing assembly 100.

Figure 2:
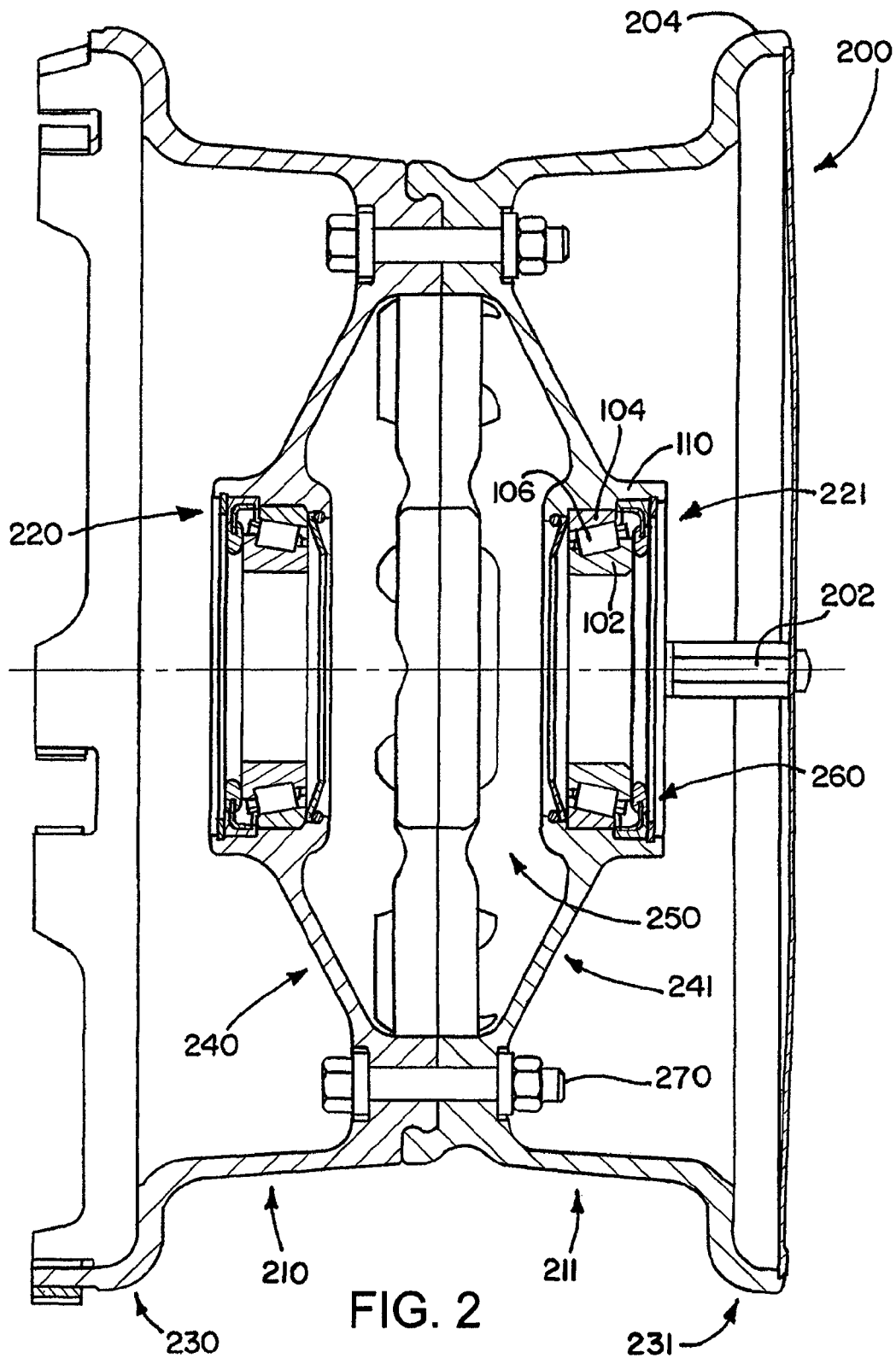
FIG. 2 is a sectional view of an aircraft wheel assembly including a bearing assembly with a grease baffle.
Figure 3:
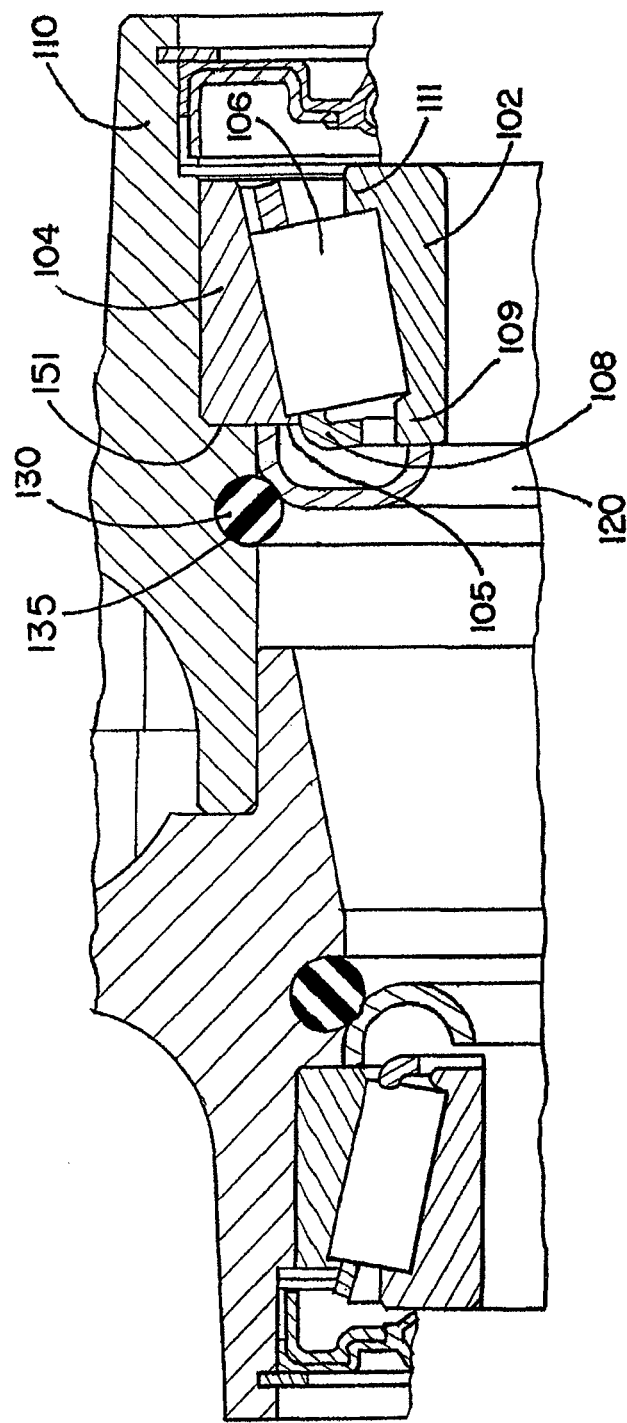
FIG. 3 is a partial sectional view of an aircraft wheel assembly including a bearing assembly with a c-shaped grease baffle.

Further, the illustrated tapered roller bearings may be used in back-to-back pairs, as shown in FIGS. 2 and 3 so that axial forces can be supported in either direction.

In use, as shown in FIGS. 2 and 3, two bearing assemblies may be disposed in a wheel assembly 200 in a back-to-back or inverted arrangement. In the wheel assembly 200, the axle 202 may remain fixed with respect to the vehicle the wheel is attached to, while the rim 204 rotates about the axle 202. In this configuration, the inner race 102 is rigidly affixed to the axle 202 and does not rotate. The outer race 104 is rigidly affixed to a support body 110 and both rotate with the rim 204 of the wheel.

This rotation causes a centrifugal force which tends to fling the bearing lubricant to the outer diameter of the outer race 104 and out of the bearing assembly. Because there are situations in which a bearing assembly is not exposed to contaminants, a bearing seal may not be needed. In these cases, for example, where the overriding concern is maintenance of lubrication, a baffle may be simpler and cheaper and may cause less friction when in use. As shown in FIGS. 2 and 3, for example, bearing assemblies in an aircraft wheel may have their axially outer sides sealed with a bearing seal to keep out contaminants, while their axially inner sides may include a simpler baffle to retain lubricant.

As such, in order to keep the bearing lubricant from migrating out of the bearing assembly 100, the assembly of FIGS. 2 and 3 includes an annular grease baffle 120 axially spaced from the outer race 104 and inner race 102 which acts as a barrier to prevent lubricant from escaping. The grease baffle 120 may have any appropriate cross section so as to contain the lubricant.

In one embodiment, for example as shown in FIG. 3, the grease baffle 120 may be generally "c" shaped and positioned so that the concave side of the grease baffle 120 faces the plurality of bearing elements 106. In some applications this shape may help redirect the bearing lubricant back towards the plurality of bearing elements 106. During rest, this shape may also act to provide a reservoir for lubricant that drains from around the bearing elements due to gravity. Typically, any oozing of the lubricant due to gravity or flight (or other) loads is remedied by rolling on take-off and landing, or other use of the bearing assembly.

As shown in FIG. 3, the grease baffle 120 may have a portion, in this embodiment an end of the 'c', which is disposed against a retaining surface. This retaining surface may be, for example, a sidewall 105 of the outer race 104, as shown in FIG. 3. Alternatively, the retaining surface may be an axial ledge in the support body 110, or a retaining ring disposed in an annular groove of the support body 110 (not shown). The inner diameter of the grease baffle 120 may be adjacent to the inner race 102, or may be spaced therefrom.

Figure 4:
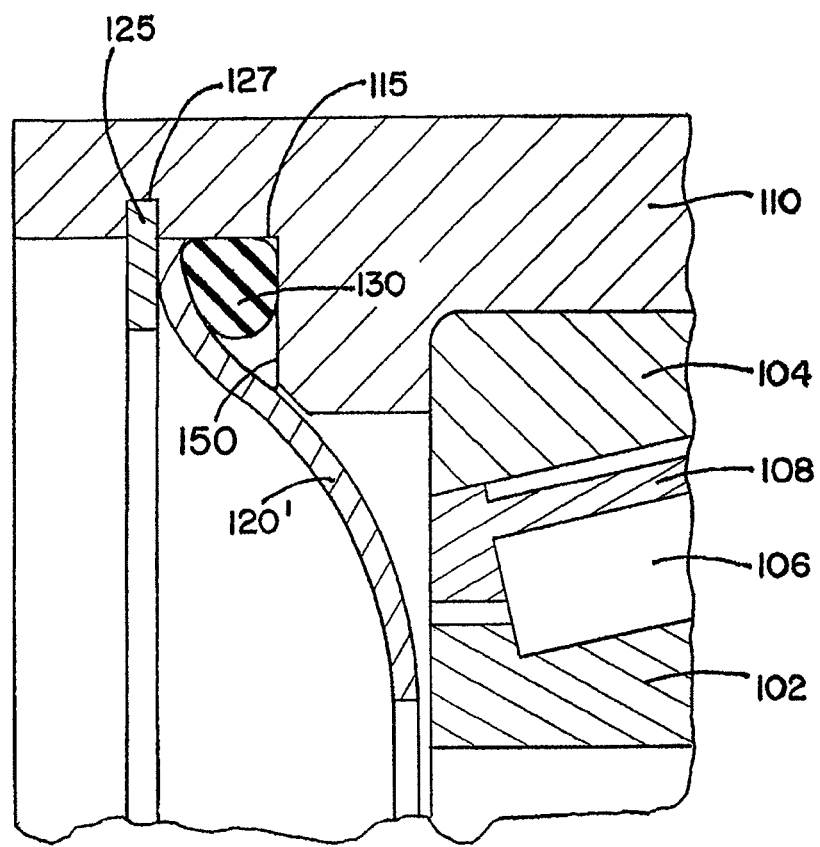
FIG. 4 is a partial sectional view of a bearing assembly in accordance with the present invention including an ogee-shaped grease baffle.

In another embodiment, for example, in FIG. 4, the grease baffle 120' may be ogee shaped. Preferably, an ogee shaped grease baffle 120' is disposed so that the inner diameter of the grease baffle 120' is proximal the outer race 104 and inner race 102 as compared to the outer diameter. In other words, the ogee shape curves axially and radially inwardly, as shown in FIG. 4.

A radially outer portion of grease baffle 120' may be disposed against a retaining ring 125 or a ledge (not shown) in the support body 110. The retaining ring 125 may be disposed in an annular groove 127 of the support body 110, and may be made of any suitable material for retaining the baffle 120'. The radially inner side of the baffle 120' may be adjacent to or spaced from the inner race 102.

Other shapes for the grease baffle are possible but are omitted for brevity.

Regardless of the shape, the grease baffle 120, 120' may be retained in the support body 110 by an annular resilient sealing member 130, a retaining ring 125, or a combination thereof. Further, the resilient sealing member 130 provides a positive retention force (preload energizer) by pressing the grease baffle 120, 120' against an opposing retaining surface thereby preventing rattling during use and helping to seal the baffle against the retaining surface. In addition to retaining and preloading the grease baffle 120, 120', the resilient sealing member 130 may also seal the interface between the grease baffle 120, 120' and an abutment surface (e.g., portion of the support body 110 or the outer race 104) to prevent leakage of lubricant at the site of the resilient sealing member 130. In a preferred embodiment, the resilient sealing member is elastomeric. In another preferred embodiment, the resilient sealing member is an O-ring. The resilient sealing member may be received in an annular resilient sealing member groove 135 in the inside surface of the support body 110, or may be disposed against the inside surface of the support body 110 and between the grease baffle 120, 120' and either a counter bore 115 of the support body or the outer race 104 itself.

The retaining surface may be, for example, an axial ledge 150 of the support body 110. Alternatively, the retaining surface may be an axial surface 151 of the outer race 104. Alternatively, the retaining surface may be the removable retaining ring 125 disposed in an annular groove 127 of the support body 110. Further, the retaining surface may be a combination of one or more of these elements.

Because the grease baffle 120, 120' is not necessarily providing a seal against contaminants, a relatively large gap between the baffle and the races 102, 104 may exist.

The grease baffle 120, 120' and resilient sealing member 130 may be installed and removed using standard O-ring/retaining ring installation and removal tools (for example, picks and the like). The grease baffle 120, 120' may be installed and removed independently of the outer race 104, thereby preventing damage and simplifying maintenance by reducing maintenance costs and downtime.

Referring back to FIG. 2, the bearing assembly 100 may be used in the wheel assembly 200. As shown, the wheel assembly may include two wheel halves 210, 211. Each wheel half may include a hub portion 220, 221. The rim 204 may be made of two rim portions 230, 231 respectively connected to the hub portions 220, 221 by web portions 240, 241. The hub portions 220, 221, and optionally the web portions 240, 241, may define an interior space 250. The grease baffles may be disposed on an interior side of the wheel halves and be used to prevent lubricant from migrating out of the bearing assemblies and into this interior space 250. The grease seals 260 may be used to seal the bearing assemblies from an exterior side of the wheel halves. In this configuration, the wheel halves 210, 211 rotate around the fixed axle 202. The wheel halves may be connected together by a plurality of fasteners 270 (e.g., bolts) and may be disassembled by removal of the fasteners in order to access the interior side of the wheel halves. Such access allows easy removal of the grease baffles without removal of the outer race from the bearing assembly 100.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A bearing assembly comprising:
   an outer race;
   an inner race;
   a plurality of bearing elements disposed between the inner and outer races for allowing relative rotational movement between the inner and outer race;
   an annular support body rigidly supporting the outer race and extending therefrom in an axial direction;
   an annular grease baffle disposed axially proximal to the outer race and inner race for preventing migration of grease away from the plurality of bearing elements, wherein the annular grease baffle has a radially outer portion disposed against a retaining surface and a radially inner portion that extends radially inwardly from the radially outer portion and axially toward the inner race; and
   an annular resilient sealing member interposed between the baffle and an abutment surface, wherein the sealing member axially biases an outer periphery of the baffle against the retaining surface for preventing movement of the baffle with respect to the support body.

2. The bearing assembly of claim 1, wherein the resilient sealing member is disposed in an annular groove in the support body.

3. The bearing assembly of claim 1 further comprising an annular retaining element having the retaining surface, the retaining element being disposed in an annular retaining element groove of the support body.

4. The bearing assembly of claim 1, wherein the retaining surface is an axial surface of the outer race.

5. The bearing assembly of claim 1, wherein the annular resilient sealing member is disposed between the grease baffle and an axial ledge of the support body.

6. The bearing assembly of claim 1, wherein the annular grease baffle is removable from the support body without removal of the outer race.

7. An aircraft wheel comprising wheel halves, each half including:
   the bearing assembly of claim 1,
   a hub half forming the support body and the hub halves collectively defining an interior space,
   a bearing seal for sealing the bearing assembly from an exterior side of the wheel half, and
   wherein the grease baffle of the bearing assembly is disposed on an interior side of the wheel half for preventing grease from migrating out of the bearing assembly into the interior space.

8. The combination of claim 7, wherein the grease of each wheel half can be removed, independent of the outer race of the bearing assembly, from the hub half forming the support body by removal of respective retaining rings or resilient sealing members.

9. A method for preventing lubricant from migrating out of the bearing assembly of claim 1, the method comprising the steps of:
   preloading the grease baffle against the retaining surface with the annular resilient sealing member; and
   sealing an interface between the grease baffle and the support body with the annular resilient sealing member.

10. A method for removing a grease baffle from the bearing assembly of claim 1, the method comprising the steps of:
    removing the annular resilient sealing member; and
    removing the grease baffle without removing and without damaging the outer race.

11. The method of claim 10, further comprising the step of:
    removing a retaining element from a retaining element groove in the support body.

* * * * *